Dec. 16, 1958  S. G. EDLING ET AL  2,864,171
APPARATUS FOR CONTINUOUS MEASUREMENT OF THE
THICKNESS OF STRIP MATERIAL
Filed July 1, 1957
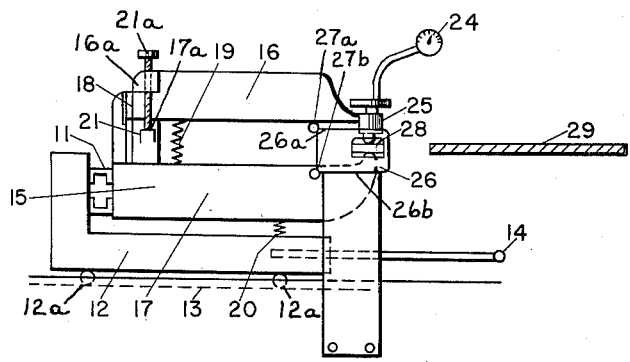
FIGURE—1
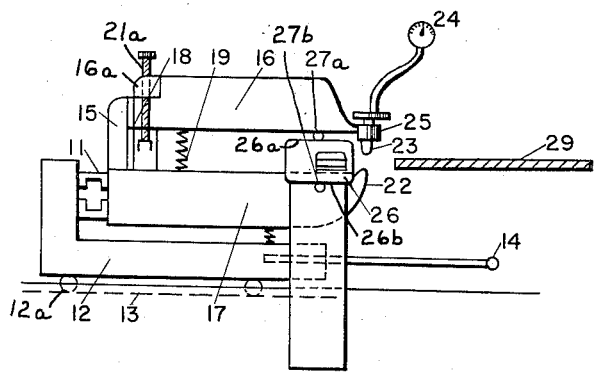
FIGURE—2
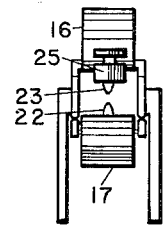
FIGURE—4
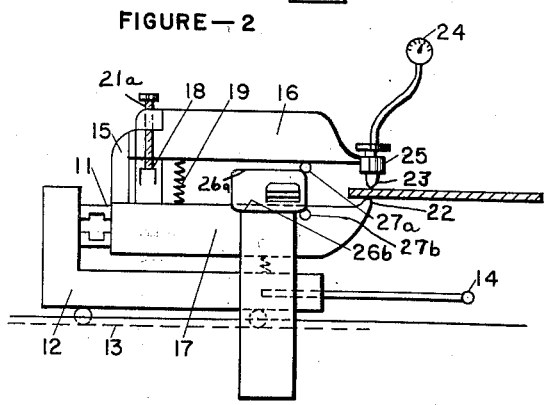
FIGURE—3
INVENTORS
Sven Gunnar Edling
Åke Henrik Malmquist
Arthur Lennart Emanuel Lindstein
By Pierce, Scheffler & Parker
Attorneys United States Patent Office 2,864,171
Patented Dec. 16, 1958

2,864,171

APPARATUS FOR CONTINUOUS MEASUREMENT OF THE THICKNESS OF STRIP MATERIAL

Sven Gunnar Edling, Åke Henrik Malmquist, and Arthur Lennart Emanuel Lindstein, Sandviken, Sweden, assignors to Sandvikens Jernverks Aktiebolag, Sandviken, Sweden, a corporation of Sweden Application July 1, 1957, Serial No. 669,236

Claims priority, application Sweden July 18, 1956

5 Claims. (Cl. 33—147)

This invention relates to measuring apparatus and more particularly to apparatus for continuously measuring the thickness of strip material such as rolled metallic strip which is fed through the measuring apparatus.

Many different types of measuring apparatus have been developed for this purpose but all have a common disadvantage in that it has not been possible during operation of the apparatus to periodically check it for accuracy, i. e. periodically calibrate the apparatus against a standard. Efforts have been made to pass a piece of strip material with known thickness through the measuring apparatus but this has necessitated interruptions to operations, and losses by means of which the measuring geometry, i. e. the positions of the measuring elements in relation to the strip, has not always become quite correct. Efforts have also been made to use other forms of standards such as gauge blocks and the like for periodically checking the accuracy of the measuring apparatus but here also similar difficulties have been encountered. Consequently, it has been impossible with the prior developed arrangements to satisfactorily detect any error in the measuring apparatus.

In accordance with the present invention, all of the disadvantages of the prior constructions are overcome and the objective is attained in that the measuring apparatus is arranged to be moved generally transversely of the traveling strip between two positions, one such position being the measuring position at the strip and the other position being the calibrating or measuring accuracy determining position away from the strip and wherein the measuring apparatus is brought into association with a standard such as a gauge block or the like. The arrangement according to the invention thus permits for example in connection with the measurement of cold rolled strip to indicate strip thickness or such other dimension as is to be determined and at any desired time without interrupting rolling operations to quickly relocate the measuring apparatus to another position where its accuracy is easily determined by the gauge that becomes automatically associated with it. Thus no additional time is required to perform special set-up operations to effect the accuracy check.

A secondary advantage which the new arrangement possesses is that the confronting measuring elements which in measuring position engage opposite faces of the strip whose thickness is being measured and which in the calibrating position engage opposite faces of the standard gauge do not slide on the surfaces of either the continuous strip or the gauge when the measuring apparatus is shifted from the measuring position to the calibrating position, or vice versa, thus eliminating or at least materially reducing the chances for damaging the measuring elements. More particularly, such advantage is attained by means of a novel spacer device which functions to spread the measuring elements apart while the apparatus is being shifted from one position to the other.

The foregoing as well as other objects and advantages inherent in the invention will become more apparent from the following detailed description of one suitable embodiment thereof when considered with the accompanying drawings in which:

Fig. 1 is a view in side elevation of the measuring apparatus in its calibrating position;

Fig. 2 is a view similar to Fig. 1 but showing the measuring apparatus during transport from the calibrating position to the measuring position on the strip material;

Fig. 3 is also a view similar to Fig. 1 but showing the measuring apparatus in its measuring position on the strip; and Fig. 4 is an end elevation detail showing the arms and the measuring elements which are supported in confronting spaced relationship for contact with opposite faces of either the strip being measured or the gauge strip or block.

With reference now to the drawings, the entire measuring apparatus 15 is seen to be attached by means of a flat spring 11 or a hinge device or strip or equivalent to a carriage 12 which is arranged to slide or roll upon a base 13 between the measuring and calibrating positions. In the illustrated embodiment rolls 12a at the front and rear of the carriage are provided between the underface of the carriage and the base 13. Any means may be provided for moving the carriage 12 and such means in the present embodiment is constituted by a handle 14 extending longitudinally outward of the same and adapted to be actuated manually.

The measuring apparatus is comprised of two parallel spaced arms 16, 17 which extend longitudinally of the carriage. The outer ends of these arms, i. e. to the right as viewed in Fig. 1, are arranged to be moved towards and away from each other, and this is accomplished by means of a hinge arrangement 18 between the two arms at their inner ends, i. e. to the left as viewed in Fig. 1. A spring 19 in tension extending between the two arms 16, 17 serves to draw the arms towards each other and the normal distance between the two arms is determined by an adjustable stop mechanism 21 comprising a threaded stud 21a which threads vertically through a protuberance 16a on the upper arms 16 into engagement with a stop shoulder 17a on the lower arm 17. Thus when the arms 16, 17 are spread apart when the measuring apparatus is shifted from its measuring to its calibrating positions, and vice versa, they will always return to the same position as the end of the stud 21a comes into engagement with the stop shoulder 17a. Different stop positions are of course obtained by changing the adjustment of the stud 21a, i. e. by screwing the same towards or away from the stop shoulder 17a.

If desired, resilient means in the form of a helical spring 20 under compression may be provided between the under face of the lower arm 17 and the upper face of carriage 12.

The outer ends of the arms 16, 17 in the present embodiment carry the measuring means per se although it will be apparent that possibly in other embodiments the measuring means may be carried by only one of the arms. In the present embodiment, however, the lower arm is provided with a fixed measuring point 22 at its outer end and the upper arm is provided at its outer end with a movable measuring point 23 integral with a measuring device indicated generally at 25. The measuring device 25 may be any well known kind, for example in accordance with Swedish Patent No. 114,482 or its British equivalent No. 627,004 or its United States equivalent No. 2,746,424. The measuring device per se may also be established in accordance with the construction disclosed in Swedish Patent No. 117,409 or its United States equivalent No. 2,478,391. It is also possible to use other well known measuring apparatus operating on pneumatic, hydraulic or electrical principles. Also one may use a measuring device of the kind wherein a stream of air is blown from a nozzle against the surface of the strip to be measured causing a counterpressure which varies in accordance with the distance between the nozzle and the strip surface, all as disclosed in United States Patent No. 1,971,271.

The indication of the measured value, e. g. the thickness of the continuous strip 29, can be established in any convenient manner such as by the mechanical transmission means disclosed in United States Patent No. 2,478,391 or it can be established as shown in the drawings by a differential manometer 24 which is adapted to be coupled to the conduits 283, 284 disclosed in United States Patent No. 2,746,424.

Disposed laterally of the path of movement of the measuring apparatus is a spacer device 26 which is fixed in position and upstands upon the base 13. This spacer device comprises a pair of parallel spaced upper and lower guide surfaces 26a, 26b arranged parallel with the arms 16, 17 and having rounded ends. A roll 27a carried by the upper arm 16 is adapted to engage the end of and climb up onto the upper guide surface 26a, thus moving the upper arm 16 upward as the carriage 12 is shifted from the position shown in Fig. 1 to the position shown in Fig. 2. Similarly, a roll 27b carried by the lower arm 17 is adapted to engage the end of the lower guide surface 26b and move down onto surface 26b as the carriage is shifted thus moving the lower arm 17 downward.

The gauge block or strip 28 which provides a calibration check of the measuring device is conveniently carried by the spacer device 26 but it can be otherwise supported.

The gauge strip 28 is preferably located in the same plane as the strip 29 to be measured and the latter runs perpendicular to the plane of the drawing between the gauging points 22, 23 as its thickness is continuously measured. The gauge strip 28 preferably is of the same thickness as the desired thickness for the strip 29 being measured but it can be of lesser or greater known thickness provided such thickness lies within the measuring range of the measuring means 25.

In the position indicated in Fig. 1 wherein the measuring points 22, 23 lie in contact with opposite faces of the gauge strip 28 in order to check the accuracy of the measuring instrument 25 it will be noted that the rolls 27a, 27b are located to the left of the combined guide and lifting faces 26a, 26b. In this position, the stud 21a will have been so adjusted that the arms 16, 17 which carry the measuring points 22, 23 respectively are in the proper positions to enable the measuring points to contact the opposite faces of the gauge strip 28. After the measuring accuracy of the device 25 has been checked against the standard strip 28, the carriage is shifted to the right by means of the handle rod 14. Fig. 2 shows the intermediate position of the carriage and it will be noted that the arms 16, 17 have been spread apart due to the fact that the rolls 27a, 27b have climbed onto the guide surfaces 26a, 26b. As a matter of fact, the rolls 27a, 27b start their climb onto the rounded ends of the surfaces 26a, 26b thus moving the arms 16, 17 apart as soon as the movement of the carriage commences. The effect of this is to lift the measuring points 22, 23 out of contact with the opposite faces of the gauge strip 28 and thus prevent the points from gliding across the latter as the carriage is shifted from the gauging position back to the measuring position on the strip 29 thus eliminating contact and frictional damages to the measuring points.

When the carriage reaches a position nearing that indicated in Fig. 3 the measuring points 22, 23 will have moved into position at opposite faces of the strip 29. At such time the rolls 27a, 27b move down the rounded portions at the right end of the guide surfaces 26a, 26b and the spring 19 pulls the arms 16, 17 and hence the measuring points to the gauging position. In such position, the measuring device 25 will thus indicate on the dial 24 the thickness of the strip 29 as it moves past the points 22, 23.

When the carriage 12 is shifted in the reverse position whenever it is desired to make a check on the accuracy of the measuring device 25, the rolls 27a, 27b begin to climb onto the guide surfaces 26a, 26b as soon as the carriage movement begins thus lifting the measuring points 22, 23 out of contact with the strip 29 and maintaining the points 22, 23 in such positions until the carriage has returned to the position indicated in Fig. 1 whereupon the rolls 27a, 27b drop off the rounded left ends of the guide surfaces 26a, 26b and permit the measuring points 22, 23 to move towards one another and engage opposite faces of the gauge strip 28.

In the illustrated embodiment of the invention the path of movement of the carriage 12, and hence also that of the measuring apparatus carried by it, is normal to the longitudinal direction of the continuous strip 29. This, of course, provides the shortest path for shifting the measuring apparatus between its measuring position and its gauging position. However, it will be understood that the carriage can be arranged to move towards and away from the strip 29 at some other angle.

In conclusion, it will be understood that while one practical embodiment of the invention has been described and illustrated, it is possible to make various changes in the construction and arrangement of the component parts without, however, departing from the spirit and scope of the invention as defined in the appended claims.

We claim:

1. Apparatus for measuring the thickness of a continuous strip material and the like which moves longitudinally of itself comprising a pair of support arms extending generally parallel with but at opposite sides of the plane containing the strip material, the inner ends of said arms being interconnected and the outer ends of said arms being spaced apart, a measuring device carried by the outer ends of said arms, a carriage on which said support arms are mounted, said carriage being movable towards and away from the strip material between a measuring position wherein said measuring device measures the thickness of the strip material and a gauging position wherein said measuring device is to be calibrated, and a calibration gauge located at said gauging position.

2. Apparatus as defined in claim 1 wherein said measuring device includes measuring points at the outer ends of said arms, said measuring points being arranged to engage opposite faces of said calibration gauge and the strip material.

3. Apparatus as defined in claim 2 and which further includes spacer means operable upon initial movement of said carriage between its two positions to spread said arms and hence also said measuring points apart to thereby lift the same out of contact with the opposite faces of said calibration gauge and the strip material.

4. Apparatus as defined in claim 3 wherein said spacer means comprises a stationary structure including spaced upper and lower guide surfaces and roll means carried by said arms which are arranged to climb onto said guide surfaces and thereby move said arms away from each other upon initial movement of said carriage and arms in either direction.

5. Apparatus for measuring the thickness of a continuous strip material and the like which moves longitudinally of itself comprising a pair of support arms extending generally parallel with but at opposite sides of the plane containing the strip material, means interconnecting the inner ends of said arms, the outer ends of said arms being spaced apart, means for adjusting the spacing between the outer ends of said arms, a measuring device including a movable measuring point disposed at the outer end of one of said arms, the outer end of the other arm constituting a fixed measuring point, a carriage on which said support arms are mounted, said carriage being movable in a direction generally transverse to the longitudinal axis of the strip material towards and away from the strip material between a measuring position wherein said measuring points engage opposite faces of the strip material thereby to measure its thickness and a gauging position wherein said measuring device is to be calibrated, and a calibration gauge located at said gauging position and into contact with which said measuring points are brought as said carriage reaches said gauging position.

References Cited in the file of this patent

UNITED STATES PATENTS

| | | |
|---|---|---|
| 1,591,259 | Ames | July 6, 1926 |
| 1,971,271 | Mennesson | Aug. 21, 1934 |
| 2,478,391 | Segerstad | Aug. 9, 1949 |
| 2,721,317 | O'Neill | Oct. 18, 1955 |
| 2,746,424 | Segerstad et al. | May 22, 1956 |
| 2,794,258 | Danielsson | June 4, 1957 |

FOREIGN PATENTS

| | | |
|---|---|---|
| 661,559 | Great Britain | Nov. 21, 1951 |
| 134,409 | Sweden | Nov. 1, 1951 |